US012253842B2

(12) United States Patent
Furuta

(10) Patent No.: US 12,253,842 B2
(45) Date of Patent: Mar. 18, 2025

(54) PRODUCTION MANAGEMENT SYSTEM OF ELECTRONIC DEVICE COMPONENTS AND PRODUCTION MANAGEMENT METHOD OF ELECTRONIC DEVICE COMPONENTS

(71) Applicant: NHK SPRING CO., LTD., Yokohama (JP)

(72) Inventor: Eijiro Furuta, Yokohama (JP)

(73) Assignee: NHK SPRING CO., LTD., Kanagawa (JP)

( * ) Notice: Subject to any disclaimer, the term of this patent is extended or adjusted under 35 U.S.C. 154(b) by 305 days.

(21) Appl. No.: 17/840,513

(22) Filed: Jun. 14, 2022

(65) Prior Publication Data

US 2022/0404793 A1 Dec. 22, 2022

(30) Foreign Application Priority Data

Jun. 18, 2021 (JP) .................. 2021-101654

(51) Int. Cl.
*G05B 19/18* (2006.01)
(52) U.S. Cl.
CPC .. *G05B 19/188* (2013.01); *G05B 2219/33003* (2013.01)
(58) Field of Classification Search
CPC .................................................. G05B 19/188
USPC ........................................................ 700/121
See application file for complete search history.

(56) References Cited

U.S. PATENT DOCUMENTS

| 10,945,447 B2 | 3/2021 | Cocchi et al. |
| 2009/0203368 A1 | 8/2009 | Marsyla et al. |
| 2018/0198604 A1* | 7/2018 | Hayton .................. G06F 21/44 |
| 2018/0248873 A1* | 8/2018 | Loreskar ................. H04W 4/08 |
| 2020/0110385 A1* | 4/2020 | Yu .................... G05B 19/41875 |
| 2021/0056234 A1 | 2/2021 | Youn et al. |

FOREIGN PATENT DOCUMENTS

| CN | 112667675 A | 4/2021 |
| JP | 2011517795 A | 6/2011 |
| JP | 2012014494 A | 1/2012 |
| JP | 2019164784 A | 9/2019 |
| JP | 2020057881 A | 4/2020 |
| JP | 2020107175 A | 7/2020 |

OTHER PUBLICATIONS

Japanese Office Action (and an English language translation thereof) dated Dec. 10, 2024, issued in counterpart Japanese Application No. 2021-101654.

* cited by examiner

*Primary Examiner* — Jigneshkumar C Patel
(74) *Attorney, Agent, or Firm* — Holtz, Holtz & Volek PC

(57) ABSTRACT

In production management systems, management devices includes a management device of a pre-process which adds a hash value of a production condition information received from a preceding process and a hash value calculated from the production condition information of the pre-process to calculate a first hash value and transmit the production condition information of the pre-process and the first hash value to a management device of a current process, and the management devices includes a management device of a current process which calculates a second hash value from production condition information received, calculates a third hash value obtained by subtracting the second hash value from the first hash value.

6 Claims, 8 Drawing Sheets

PRODUCTION MANAGEMENT SYSTEM OF ELECTRONIC DEVICE COMPONENTS AND PRODUCTION MANAGEMENT METHOD OF ELECTRONIC DEVICE COMPONENTS

CROSS-REFERENCE TO RELATED APPLICATIONS

This application is based upon and claims the benefit of priority from prior Japanese Patent Application No. 2021-101654, filed Jun. 18, 2021, the entire contents of which are incorporated herein by reference.

BACKGROUND OF THE INVENTION

1. Field of the Invention

An embodiment described herein relates generally to a production management system of electronic device components and a production management method of electronic device components.

2. Description of the Related Art

Electronic device components are produced through a plurality of processes. In each of the processes, a large number of production conditions need to be set to produce electronic device components, for example, to process, coat and, mount them. It is necessary to determine whether the electronic device components so produced are produced under appropriate production conditions in each process. In some cases, it may be necessary to indicate to a destination of the electronic device components that they were produced under appropriate conditions.

In addition, there is known a technology in which one or more machine tools and one or more measuring devices are connected by a network to manage information using a blockchain. Specifically, when specifications of a motion controller for driving the main body of the measuring devices are changed, a new hash value including a hash value of the past block of the blockchain and a hash value of information of the change in the specifications is generated, and the new hash value is stored in the blockchain after it is verified and signed by a device other than the measuring devices (JP 2020-57881 A).

As described above, the electronic device components need to be produced under appropriate conditions. However, a number of processes are required to produce the electronic device components and moreover the production has to be carried out under a number of production conditions in each process. In addition, a large number of electronic components are produced using production lines. In consideration of this situation, if information on all electronic device components is to be managed for each process, the amount of information becomes enormous. If it is attempted to determine whether the electronic device components have been produced under appropriate production conditions, based on such an enormous amount of information, the load on the network and processing becomes very high.

BRIEF SUMMARY OF THE INVENTION

An embodiment described herein aims to provide a production management system of electronic device components capable of easily managing whether the electronic device components are produced appropriately, and a production management method of the electronic device components.

According to one embodiment, a production management system for electronic device components produced through plurality of production processes, the production processes respectively include production devices each of which produces the electronic device components and management devices each of which manages the production device, the management devices store production condition information indicating conditions for producing the electronic device components in the production devices, the system includes a storage unit which stores a hash value calculated from the production condition information as a management hash value for each of the production processes, when the electronic device components are produced in each of the production processes in accordance with the production condition information, the management devices includes a management device of a pre-process which adds a hash value of the production condition information received from a preceding process and a hash value calculated from the production condition information of the pre-process to calculate a first hash value and transmit the production condition information of the pre-process and the first hash value to a management device of a current process; and the management devices includes a management device of a current process which calculates a second hash value from production condition information received from the pre-process, calculates a third hash value obtained by subtracting the second hash value from the first hash value, compares the calculated third hash value and a management hash value of a process precedent to the pre-process, which is stored in the storage unit, and stores the second hash value in the storage unit when the hash value coincides with the management hash value.

The electronic device components may include a first electronic device component and a second electronic device component to be produced next to the first electronic device component, upon calculating the first hash value for the second electronic device component, the management device of the pre-process adds a first hash value stored in the storage unit for the first electronic device component to the first hash value to calculate a new first hash value; and the management device of the current process subtracts the second hash value and the first hash value for the first electronic device component stored in the storage unit from the new first hash value, and compare the calculated third hash value with a management hash value of a process precedent to the pre-process stored in the storage unit.

The management devices each may acquire product information indicating a result of measurement of electronic device components which have been completely produced, the management device of the pre-process adds a hash value of the product information received from a preceding process and a hash value calculated from the product information of the pre-process to calculate a fourth hash value and transmit the product information of the pre-process and the fourth hash value to the management device of the current process, and the management device of the current process calculates a fifth hash value from the product information received from the pre-process, calculates a sixth hash value obtained by subtracting the fifth hash value from the fourth hash value, compares the calculated sixth hash value and a management hash value of a process precedent to the pre-process, which is stored in the storage unit, and store the fifth hash value in the storage unit when the sixth hash value coincides with the management hash value.

The management devices each may store the second hash value and the fifth hash value in the storage unit and then start to produce the electronic device components.

The management devices may stop production of the production devices managed by the management devices when the third hash value does not coincide with the management hash value.

According to one embodiment, a production management method of a production management system for electronic device components produced through a plurality of production processes, the production processes respectively include production devices each of which produces the electronic device components and management devices each of which manages the production device, the management devices store production condition information indicating conditions for producing the electronic device components in the production devices, and the system includes a storage unit which stores a hash value calculated from the production condition information as a management, hash value for each of the production processes, when the electronic device components are produced in each of the production processes in accordance with the production condition information, the production management method comprises causing a management device of a pre-process to add a hash value of the production condition information received from a preceding process and a hash value calculated from the production condition information of the pre-process to calculate a first hash value and transmit the production condition information of the pre-process and the first hash value to a management device of a current process, and causing a management device of a current process to calculate a second hash value from production condition information received from the pre-process, calculate a third hash value obtained by subtracting the second hash value from the first hash value, compare the calculated third hash value and a management hash value of a process precedent to the pre-process, which is stored in the storage unit, and store the second hash value in the storage unit when the third hash value coincides with the management hash value.

According to the present invention, there can be provided a production management system of electronic device components capable of easily managing whether the electronic device components are produced appropriately, and a production management method of the electronic device components.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

One embodiment of the present invention will be described below.

Figure 1:
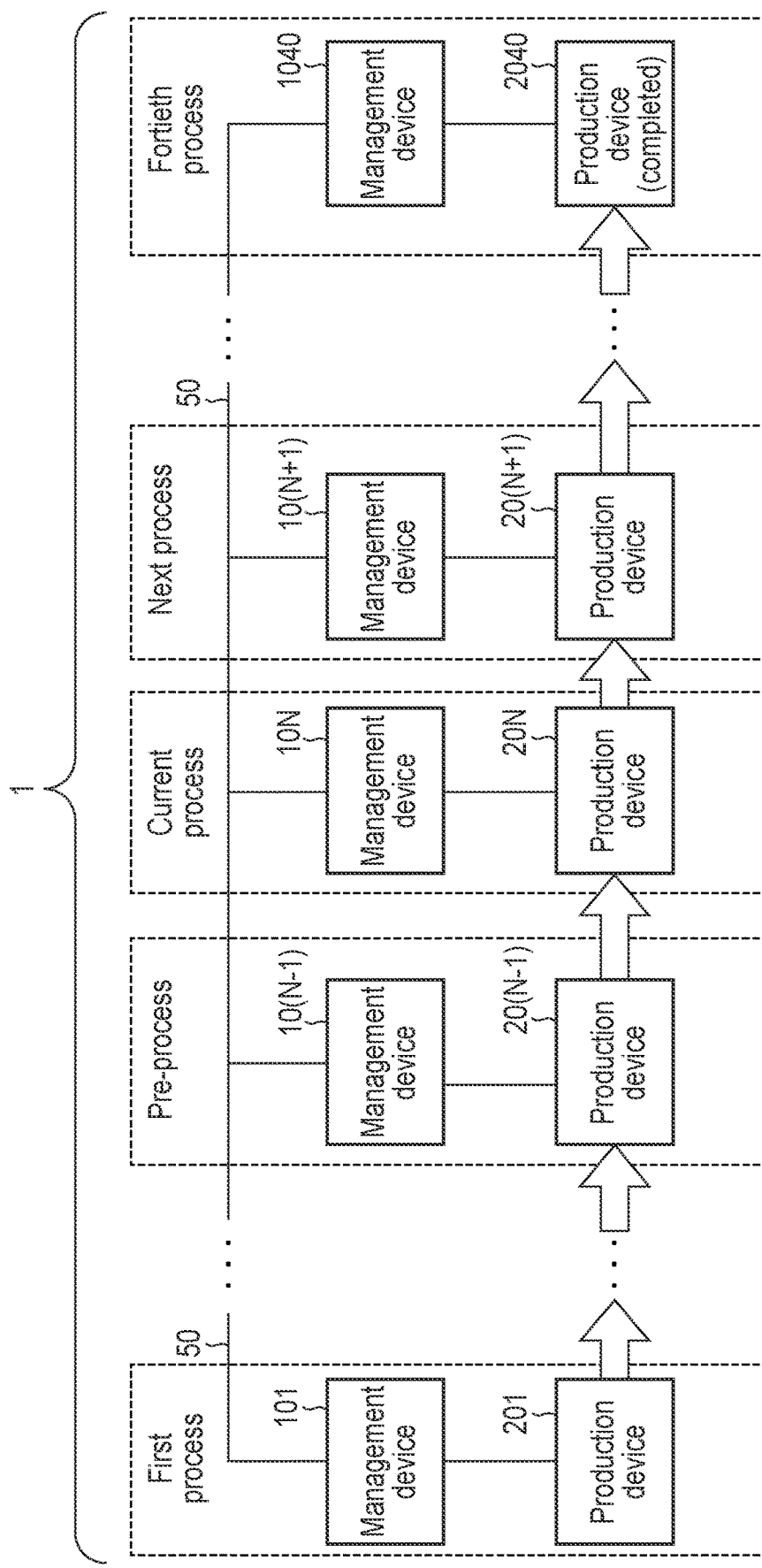
FIG. 1 is a diagram showing an example of a configuration of a production management system of electronic device components according to an embodiment of the present invention.

FIG. 1 is a diagram showing an example of a configuration of a production management system 1 of electronic device components.

As shown in FIG. 1, the production management system 1 is configured by connecting a plurality of production processes. The electronic device components are produced and managed through the production processes. The production management system 1 will be described including 40 processes from the first to fortieth processes in the present embodiment. The number of production processes included in the production management system 1 is not limited to 40, but a large number of processes has only to be included in the production management system 1. Of the first to fortieth processes, any three consecutive processes may be described as a pre-process, a current process and a post-process. Hereinafter, the first-process side will be defined as the upstream side, and the fortieth-process side will be defined as the downstream side. Thus, the first process is the most upstream process and the fortieth process is the most downstream process.

The first process includes a management device 101 and a production device 201, and the fortieth process includes a management device 1040 and a production device 2040. Thus, the first to fortieth processes each include a management device and a production device. The management devices 101 to 1040 manage their respective production devices 201 to 2040. The management devices 101 to 1040 are communicatively connected to each other via a network 50. The configuration of the management devices will be described in detail later. The production devices 201 to 2040 perform a production process for electronic device components in each of the processes. In the present embodiment, the production processes for electronic device components are performed in sequence from the first process to the fortieth process to complete the electronic components.

Figure 2:
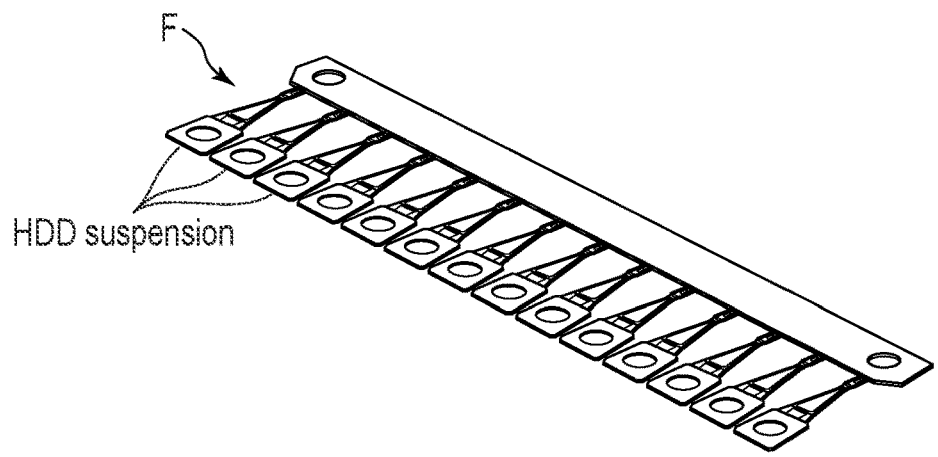
FIG. 2 is an illustration of an example of a state of a frame in a predetermined process according to the embodiment.

The electronic components are, for example, a hard disk drive suspension (hereinafter referred to as an HDD suspension). A plurality of HDD suspensions are produced from one frame (for example, a rectangular plate made of stainless steel) through a plurality of processes. FIG. 2 is an illustration of an example of a state of a frame F in a predetermined process when a plurality of HDD suspensions are produced from one frame. When a plurality of HDD suspensions are produced from the frame F, the first to fortieth processes include, for example, an applying process of applying an adhesive to the frame F, a mounting process of mounting a piezoelectric element (PZT), and an ultraviolet (UV) radiating process of radiating ultraviolet rays into the frame mounted with the piezoelectric element to fix the frame. The production devices corresponding to these processes are an applying machine, a mounting machine and a UV radiating machine. In each of the processes, numerical values of a plurality of setting items, for example, 400 setting items are set as production conditions (set values) to each of the coating machine, mounting machine and UV radiating machine, and a production process for the frame F is performed based on the production conditions.

Figure 3:
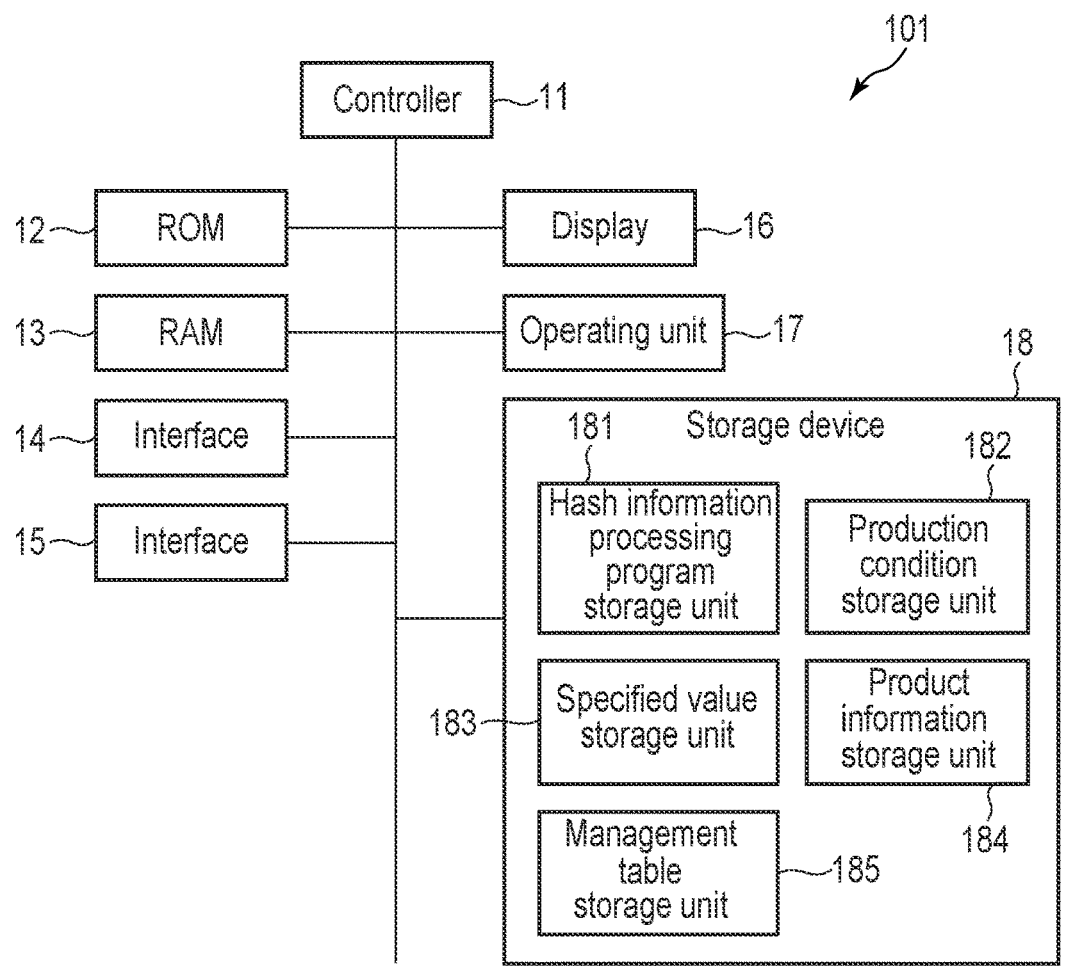
FIG. 3 is a block diagram showing an example of a configuration of a management device according to the embodiment.

Next is a description of the configuration of a management device. FIG. 3 is a block diagram showing an example of the configuration of a management device 101. Note that the management device 101 will be described as a representative because the configurations of the management devices 101 through 1040 are substantially the same.

As shown in FIG. 3, the management device 101 includes a controller 11, a ROM 12, a RAM 13, an interface 14, an interface 15, a display 16, an operating unit 17 and a storage device 18.

The controller 11 controls each unit of the management device 101. The ROM 12 stores a basic program for operating the management device 101. The RAM 13 is used, for example, as a work area for various calculations performed when the controller 11 executes a program read out of the storage device 18. The interface 14 receives and transmits information from and to another management device via the network 50. The interface 15 receives and transmits information from and to the production device 201.

The display 16 is, for example, a liquid crystal display and displays necessary information to the user of the management device 101. The operating unit 17 is, for example, a keyboard and a mouse, and the user operates the operating unit 17 to input necessary information to the management device 101. The necessary information is, for example, production conditions (set values) when the production device 201 performs a production process of electronic device components. The production conditions will be described in detail later.

The storage device 18 is, for example, a hard disk drive (HDD) and a solid state drive (SSD), and stores various programs executed by the controller 11 and various items of information. The storage device 18 includes a hash information processing program storage unit 181, a production condition storage unit 182, a specified value storage unit 183, a product information storage unit 184 and a management table storage unit 185.

The hash information processing program storage unit 181 stores hash information processing program. The hash information processing program is a program for managing hash values used by the management devices 101 to 1040 for production management, and its details will be described later with reference to FIG. 7. The production condition storage unit 182 stores the above-described production conditions. Though the production conditions vary depending on the production process, they are fixed in each production process. The specified value storage unit 183 stores a specified value. The specified value is a value for determining whether a product has normally been produced. If the measured value of the product is within the specified value, the product has been produced correctly. If the measured value is not within the specified value, the product has not been produced correctly. The product information storage unit 184 stores product information. In the present embodiment, the product information is the measurement result of the product. Therefore, in each production process, the measurement result may slightly vary from frame F to frame F. The management table storage unit 185 stores a management table. The management table is utilized when the hash information processing program processes the hash value. The management table is stored in the management table storage unit 185 of each of the management devices 101 to 1040. An example of the management table will be described with reference to FIG. 4.

Figure 4:
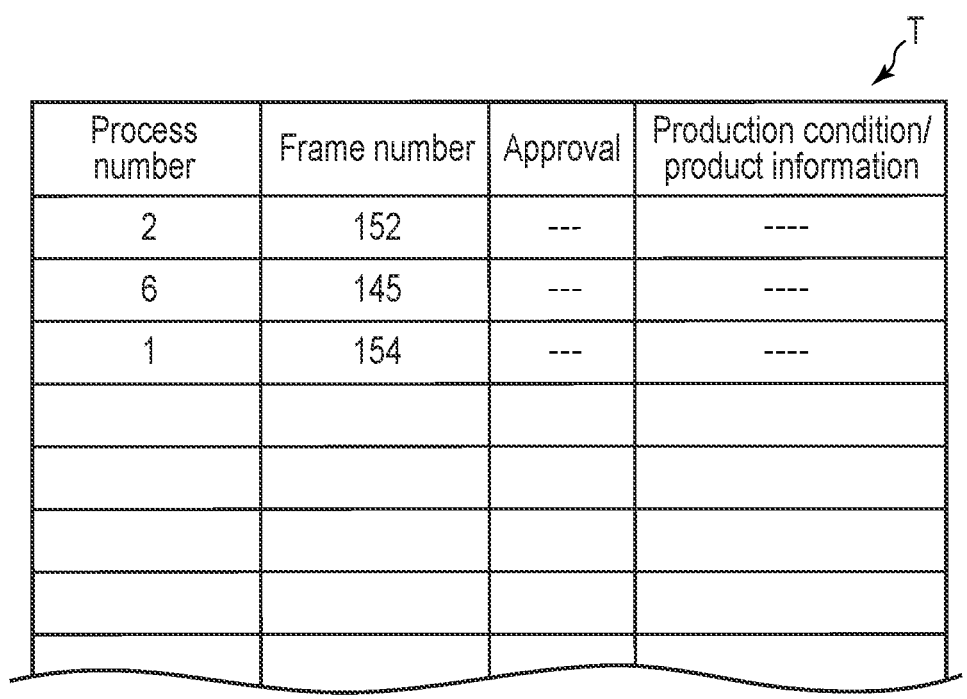
FIG. 4 is a table showing an example of a management table according to the embodiment.

FIG. 4 is a table showing an example of a management table T stored in the management table storage unit 185.

As shown in FIG. 4, the management table T includes fields of process number, frame number, approval, and production condition/product information, which are associated with one another. The field of the process number is the numbers each indicating a production process of a product. In the present embodiment, the field stores the number indicating each of the first to fortieth processes. The field of the frame number stores the number of each frame F which is a production unit of the product. The field of the approval stores a hash value if any one of the management devices 101 to 1040 determines that the product is produced based on correct production conditions/product information. The field of the production condition/product information stores production condition information or the hash value of the product information.

The storage device 18 of each of the management devices 101 to 1040 stores information of the same content in the management table T. That is, when the content of the management table T is updated in a certain management device, the updated content is transmitted to the other management devices via the network 50. Thus, the management tables T of all the management devices 101 to 1040 are updated to have the same content, and the content is shared by all of the management devices. In the management tables T, information is stored in chronological order when a hash value, which will be described in detail later, is approved.

Figure 5:
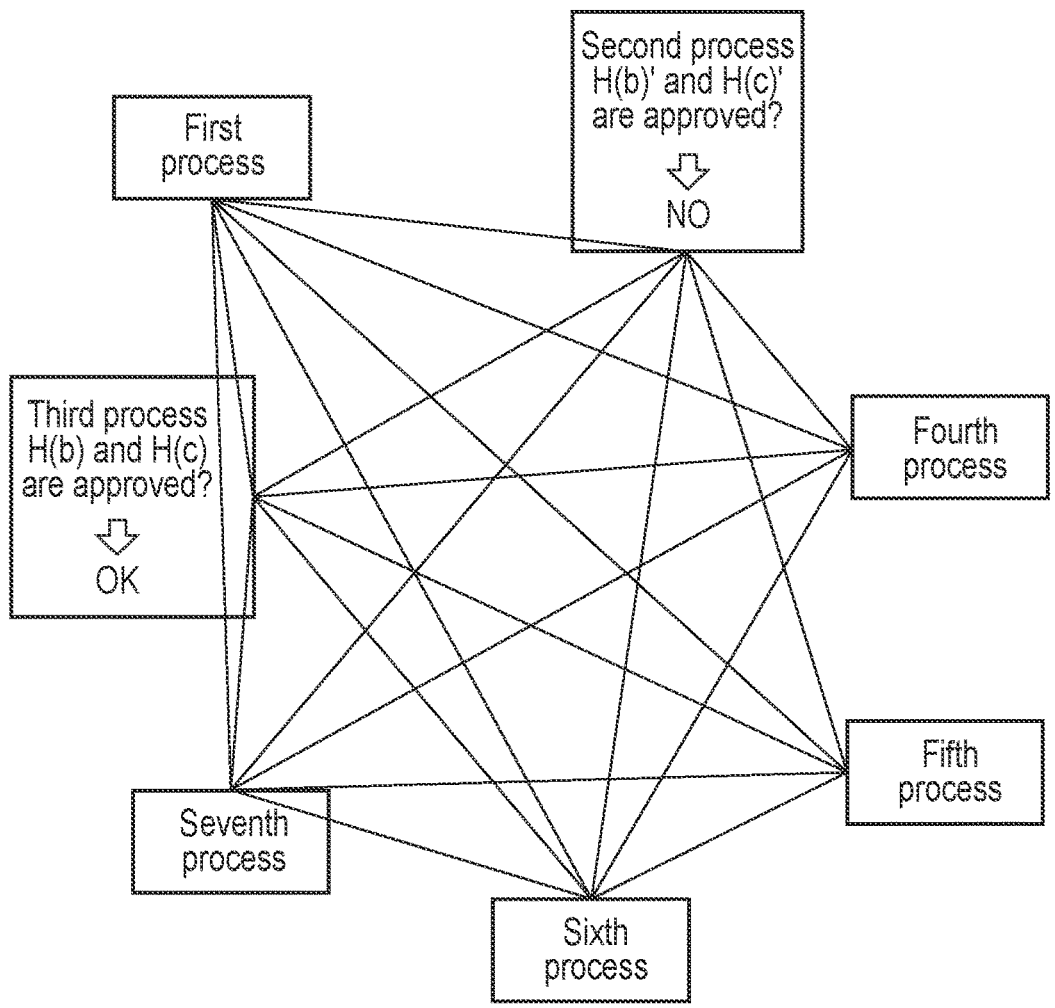
FIG. 5 is a conceptual diagram showing an example of a configuration for sharing information stored in the management table according to the embodiment.

FIG. 5 is a conceptual diagram showing an example of a configuration for sharing information stored in the management table T. For the sake of brevity, information sharing will be described by taking the first to seventh processes as an example, but information is shared by all of the first to fortieth processes.

As shown in FIG. 5, the approved information is shared among the first to seventh processes. The approval means that the hash values for use in managing a product coincide with each other. The process of managing whether the hash values coincide with each other will be described in detail later with reference to FIG. 7. When the hash values H(b) and H(c) are approved in the third process and stored in the management table T, the approved hash values H(b) and H(c) are transmitted to the first, second and fourth to seventh processes and stored in their respective management tables T. On the other hand, when hash values H(b)' and H(c)' are not approved in the second process, they are not transmitted to the first, second and third to seventh processes or not stored in their respective management tables T. In this manner, only the approved hash values are shared by the management tables T of all the management devices 101 to 1040.

Figure 6:
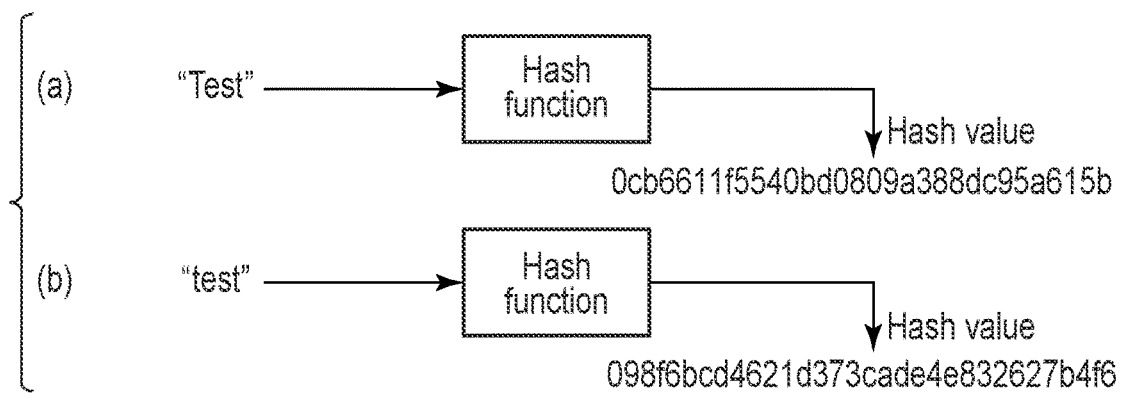
FIG. 6 is a diagram showing a specific example of calculating a hash value according to the embodiment.

A general hash value calculation method will now be described. FIG. 6 is a diagram showing a specific example of calculating a hash value. As shown in (a) of FIG. 6, when "Test" is input to the hash function, a hash value "0cbc6611f5540bd0809a388dc95a615b" is calculated as a constant value. On the other hand, when "test" whose capital letter is changed to a small letter is input, a hash value "098f6bcd4621d373cade4e832627b4f6" is calculated as a constant value as shown in (b) of FIG. 6. Thus, when different values are input to the same hash function, different values are calculated. If, therefore, hash values coincide with each other, it can be confirmed that the same value is input. In the present embodiment, message digest algorithm 5 (MD5) is used as the hash function; however, the hash function not limited to MD5 but other hash functions may be used. In short, the same hash function has only to be used in the production management system 1.

Figure 7:
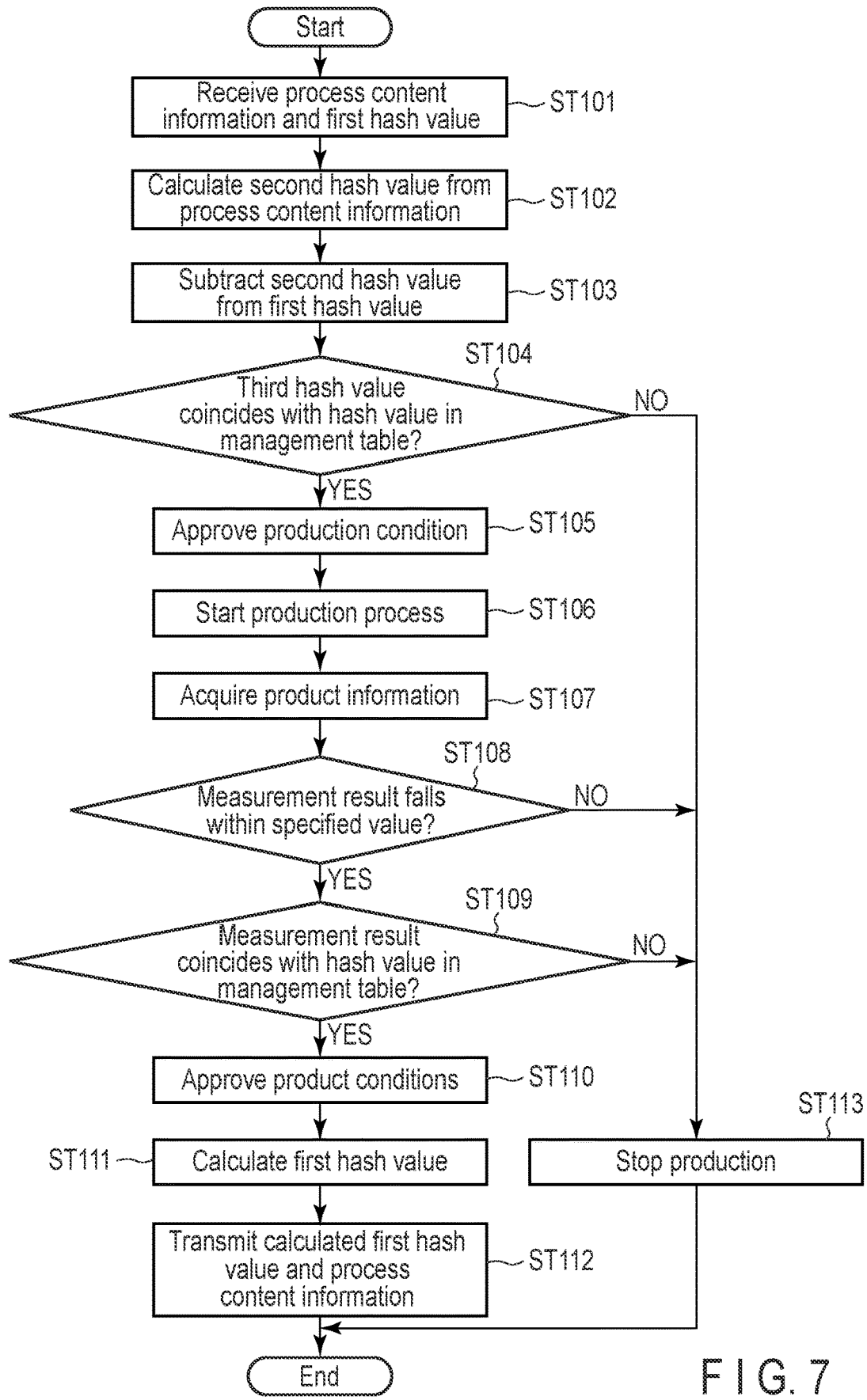
FIG. 7 is a flowchart showing an example of a process of managing a product by a controller according to the embodiment.

Next is a description of the process of the management devices 101 to 1040. FIG. 7 is a flowchart showing an example of a process of managing a product by the controller 11 of each of the management devices 101 to 1040. In the present embodiment, the process will be described as being performed by the management device 10N in the current process. The process is achieved by the controller 11 reading a hash information processing program from the hash information processing program storage unit 181.

The controller 11 receives process content information and a first hash value (ST101). More specifically, the controller 11 receives, from a management device (N−1) in the upstream pre-process, process content information indicating the process contents of the production process of the management device (N−1). Specifically, the process content information is production condition information indicating production conditions of a product and product information indicating measurement results of the product. The first hash value is calculated by adding the hash value of production condition information received by the management device (N−1) from the process precedent to the pre-process and the hash value calculated from the production condition information in the pre-process. The first hash value is also received for each of the production condition information and the product information. Since, furthermore, the HDD suspensions are continuous for each frame and the production process is performed, the management device (N−1) in the pre-process may add the first hash values stored in the management table T for the preceding frame to calculate a first hash value of the pre-process. When the first hash value is so calculated, a second hash value and a first hash value of the preceding frame stored in the management table T may be subtracted from the first hash value to calculate a third hash value, and the calculated third hash value may be compared with the hash value (management hash) in the process precedent to the pre-process stored in the management table T. Thus, the products may be managed using the hash values of consecutive frames. Assume in the present embodiment that the first hash values are calculated using the continuity of production processes and that of products. Specific examples thereof will be described later.

Then, the controller 11 calculates a second hash value from the received process content information (ST102). In the present embodiment, in order to receive production condition information and product information as the process content information, a second hash value is calculated for each of the production condition information and the product information.

Then, the controller 11 subtracts the second hash value from the first hash value (ST103). For the production condition information, the controller 11 calculates a third hash value by subtracting the second hash value calculated in step ST102 from the first hash value received from the management device (N−1) in the pre-process.

Then, the controller 11 determines whether the third hash value coincides with the hash value (management hash value) in the management table T (ST104). More specifically, the controller 11 determines whether the third hash value calculated for the production condition information coincides with the management hash value approved by the upstream management device (N−1) and stored in the management table T.

If the controller 11 determines that they coincide with each other (YES in ST104), it approves the hash value (ST105). Accordingly, the controller 11 stores the approved hash value in the management table T of the storage device 18. This hash value indicates that the production condition information of the product produced in the pre-process is correct. Thus, the hash value is stored in the management table T, and a similar hash value is stored in the management tables T of the other management devices.

Then, the controller 11 starts a production process (ST106). The controller 11 instructs the production device N to start production. The production device N thus performs a production process for the product received from the upstream production device, based on the production conditions of the process stored in the production condition storage unit 182.

When the controller 11 performs the production process, it acquires product information of the produced product (ST107). The controller 11 transmits an instruction to the production device N that manages the product, measures the product and acquires a measurement result of the product.

Then, the controller 11 determines whether the measurement result falls within the specified value (ST108). Specifically, the controller 11 determines whether the acquired measurement result falls within the specified value stored in the specified value storage unit 183.

If the controller 11 determines that the measurement result falls within the specified value (YES in ST108), it determines whether the measurement result coincides with the hash value (management hash value) of the management table T (ST109). More specifically, as in the case of the production condition information, the controller 11 determines whether a third hash value (sixth hash value) obtained by subtracting the second hash value (fifth hash value) from the first hash value (fourth hash value) and the hash value (management hash value) approved by the upstream management device (N−1) and stored in the +management table T coincide with each other for the product information. At this time, the controller 11 stores the product information in the product information storage unit 184 in association with the frame number.

When the controller 11 determines that they coincide with each other (YES in ST109), it approves the hash value (ST110). Thus, the controller 11 stores the approved hash value in the management table T of the management table storage unit 185. This hash value indicates that the product information of the product produced in the pre-process falls within the specified value. Accordingly, the hash value is stored in the management table T, and a similar hash value is stored in the management tables T of the other management devices.

Then, the controller 11 calculates a first hash value (ST111). The first hash value is obtained by adding hash values calculated from the production condition information and product information of the current process to their respective hash values of the production condition information and product information of the pre-process approved in the current process and further adding the first hash value transmitted to the management device N of the current process for the preceding frame by the management device (N−1) of the pre-process.

Then, the controller 11 transmits the calculated first hash value and the process content information to the downstream management device (N+1) (ST112). At this time, the product is also delivered from the production device N of the current process to the production device (N+1) of the downstream next process. The management device (N+1) in the next process performs a process similar to the foregoing process.

When the controller 11 determines that the third hash value or the measurement result does not coincide with the hash value stored in the management table T (NO in ST104 and ST109) or it determines that the measurement result does not fall within the specified value (NO in ST108), it stops the production (ST113). More specifically, the controller 11 instructs the production device N to stop the production. Upon receiving the instruction, the production device N stops the production. When the manager confirms the contents of the stop of production, he or she performs a predetermined operation to cause the production device N to start production. In addition, the present embodiment is directed to the case where when the controller 11 determines that the third hash value or the measurement result does not coincide with the hash value (NO in ST104 and ST109) or it determines that the measurement result does not fall within the specified value (NO in ST108), but it is not limited to this case. For example, it is also possible to share error information indicating that the frame subjected to these determinations is a product that has not been produced normally, among the management devices 101 to 1040 in the production management system 1 to prevent the production management system 1 from stopping the production. With this configuration, for example, even though a state accidentally occurs in which one frame is not properly produced, the production management system 1 need not decrease in its production efficiency. As for the products not properly obtained, it has only to specify a frame number from the foregoing error information after the last production process is completed and to exclude the product specified by the frame number.

Figure 8:
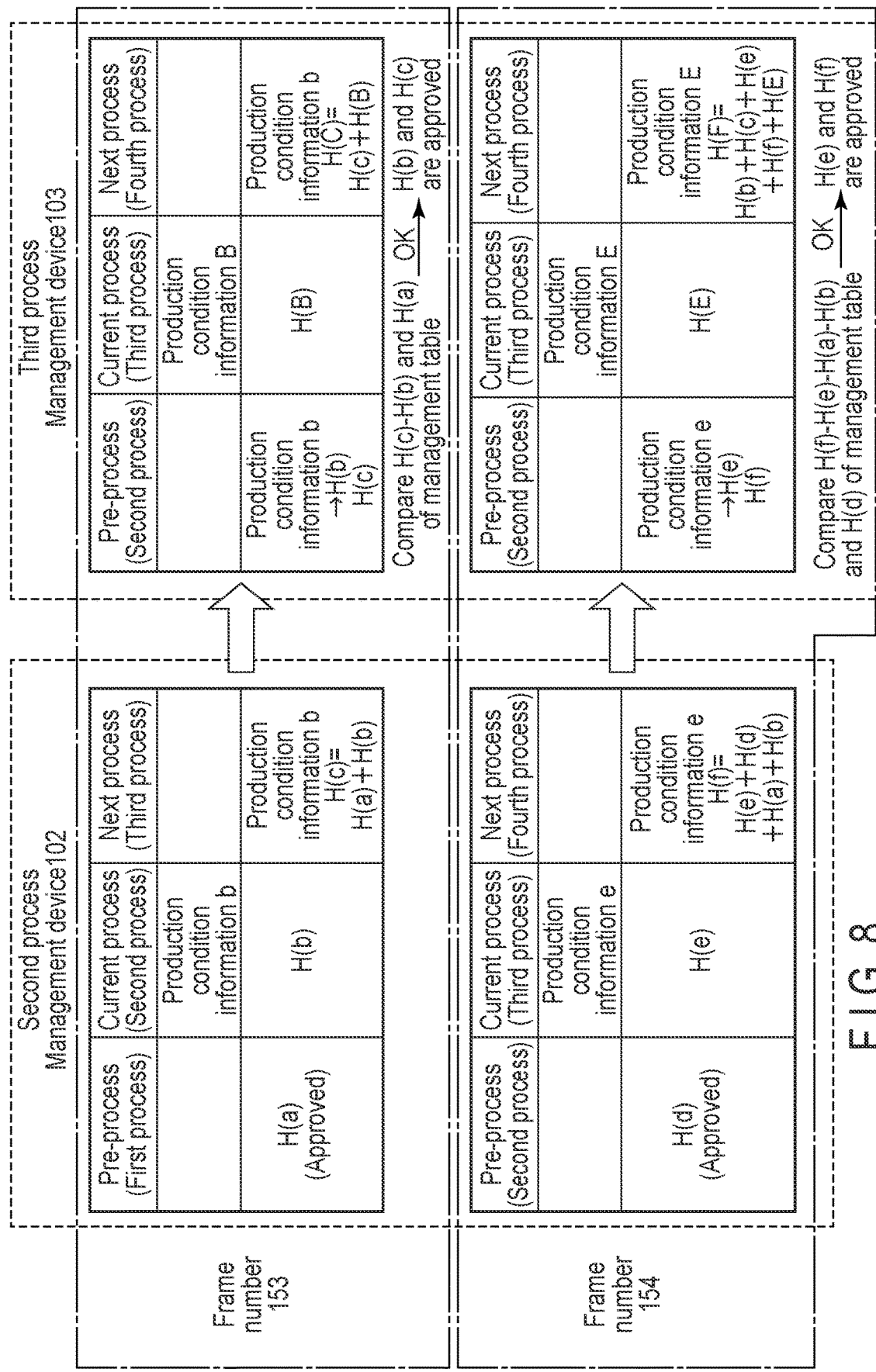
FIG. 8 is a diagram illustrating an example of management executed by the production management system according to the embodiment.

FIG. 8 is a diagram illustrating an example of management executed by the production management system 1.

In the example of FIG. 8, the management device 103 of the third process manages the production condition information based on the information received from the management device 102 of the second process. In the second process, the pre-process is a first process, the current process is a second process and the next process is a third process. In the third process, the pre-process is a second process, the current process is a third process and the next process is a fourth process. In FIG. 8, the hash values of the production condition information is represented by H. For example, the hash value of production condition information a is represented by H(a). In the example of FIG. 8, furthermore, the hash values are managed for two consecutive frames of frame number (first electronic device component) 153 and frame number (second electronic device component) 154.

First is a description of management of the production condition information of frame number 153.

Figure 9:
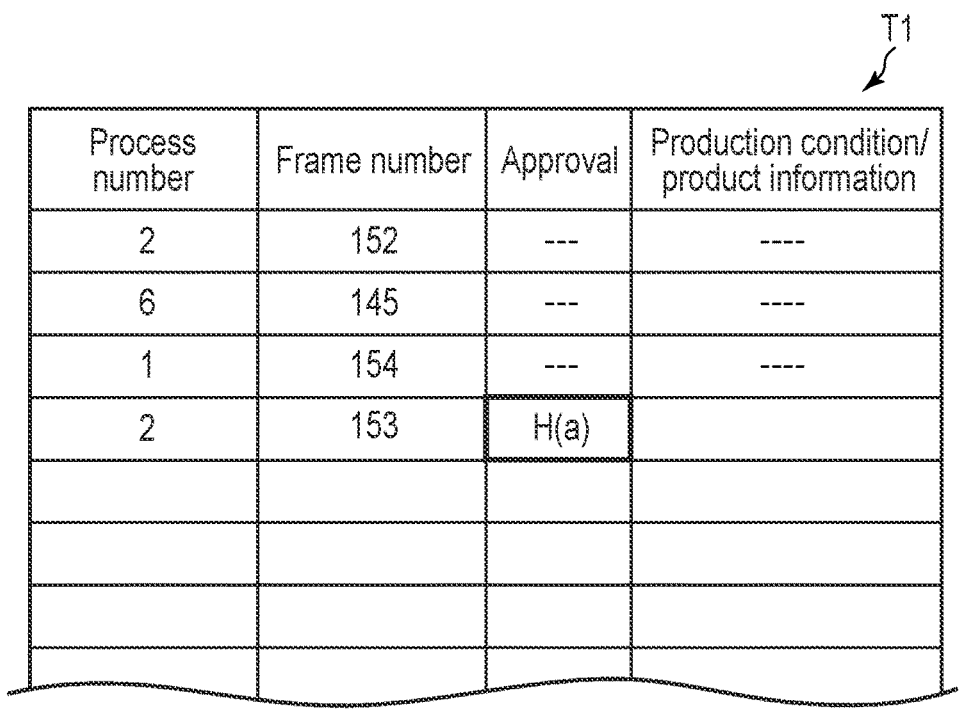
FIG. 9 shows an example of the management table according to the embodiment.

The management device 102 of the second process calculates a hash value H(b) based on the production condition information b for producing a product. Assume here that the hash value H(a) of the first process is approved by the management device 102 and stored as shown in FIG. 9 in the management table T managed in common to the management devices 101 to 1040. The management device 102 adds the hash value H(a) approved by the management device 102 to the hash value H(b) to calculate a hash value H(c). This hash value H(c) corresponds to the first hash value described above. After that, the management device 102 transmits the production condition information b and the hash value H(c) to the downstream management device 103.

Figure 10:
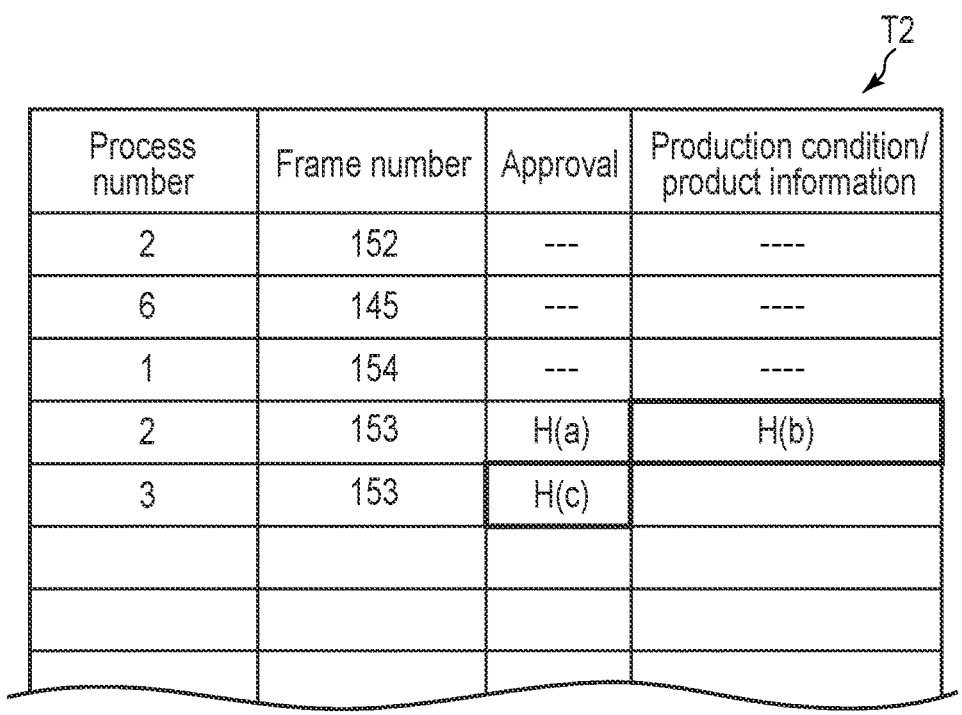
FIG. 10 shows an example of the management table according to the embodiment.

Upon receiving the production condition information b and the hash value H(c) from the upstream management device 102, the management device 103 of the third process calculates a hash value H(b) from the production condition information b. This hash value H(b) corresponds to the second hash value described above. Then, the management device 103 subtracts the hash value H(b) (second hash value) from the hash value H(c) (first hash value). Since the hash value H(c) corresponds to the sum of the hash value H(a) and the hash value H(b), the hash value H(a) is calculated by subtracting the hash value H(b) that is the calculated second hash value. This hash value H(a) corresponds to the third hash value described above. The management device 103 compares the hash value H(a) as the calculated third hash value and the hash value H(a) stored in the management table T. If they coincide with each other, the product of frame number 153 is one produced under the correct production conditions in the second process. The management device 103 thus approves the hash values H(b) and H(c) and stores them in the management table T. Accordingly, the hash values H(b) and H(c) are stored in the management table T as shown in FIG. 10. The information is transmitted to the other management devices 101, 102 and 104 to 1040, and the hash values H(b) and H(c) are similarly stored in the management tables T of the management devices 101, 102, 104 to 1040.

Then, the management device 103 calculates a hash value H(B) based on the production condition information B for producing a product. The hash values H(b) and H(c) are approved by the management device 103 and stored as shown in FIG. 10 in the management table T managed in common to the management devices 101 to 1040. The management device 103 adds the hash value H(c) approved by the management device 101 to the hash value H(B) to calculate a hash value H(C). This hash value H(C) corresponds to the first hash value described above. After that, the management device 103 transmits the production condition information B and the hash value H(C) to the downstream management device 104. Then, like the foregoing management device 103, the management device 104 repeats the process.

Next is a description of management of the production condition information of frame number 154.

Figure 11:
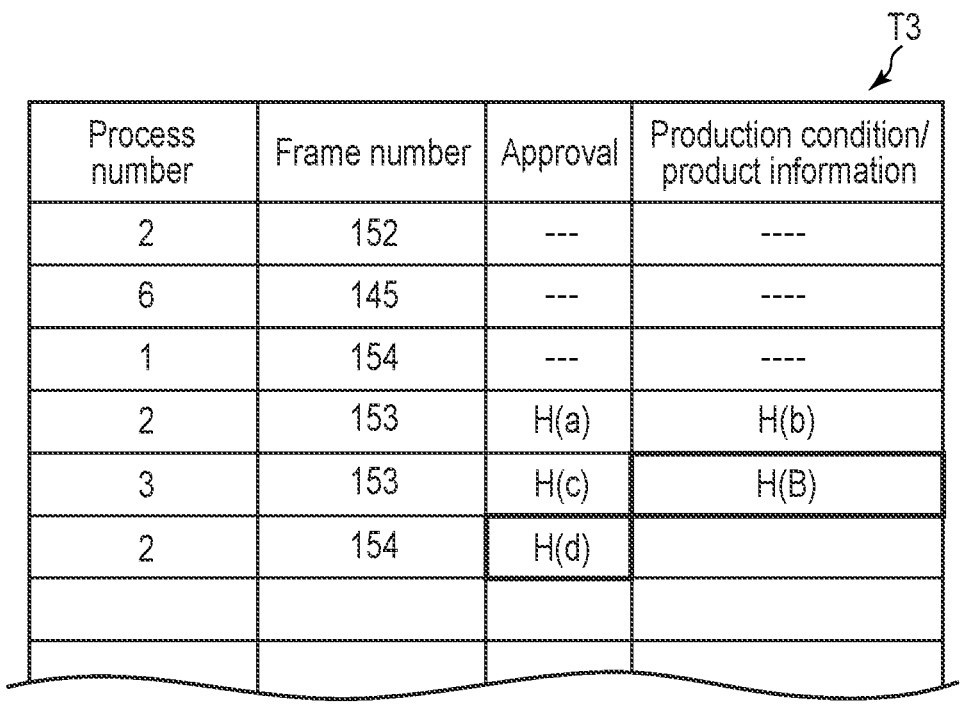
FIG. 11 shows an example of the management table according to the embodiment.

The management device 102 of the second process calculates a hash value H(e) based on the production condition information e for producing a product. Assume here that the hash values H(d) and H(B) of the second process is approved by the management device 103 of the third process and stored as shown in FIG. 11 in the management table T managed in common to the management devices 101 to 1040. The management device 102 adds the hash value H(d) approved by the management device 101 to the hash value H(e) and also adds the hash values H(a) and H(b) stored in the management table T thereto for the preceding frame number 153, thereby calculating a hash value H(f). That is, the hash value H(f) is equal to the sum of the hash values H(e), H(d), H(a) and H(b). This hash value H(f) corresponds to the first hash value described above. After that, the management device 102 transmits the production condition information e and the hash value H(f) to the downstream management device 103.

Figure 12:
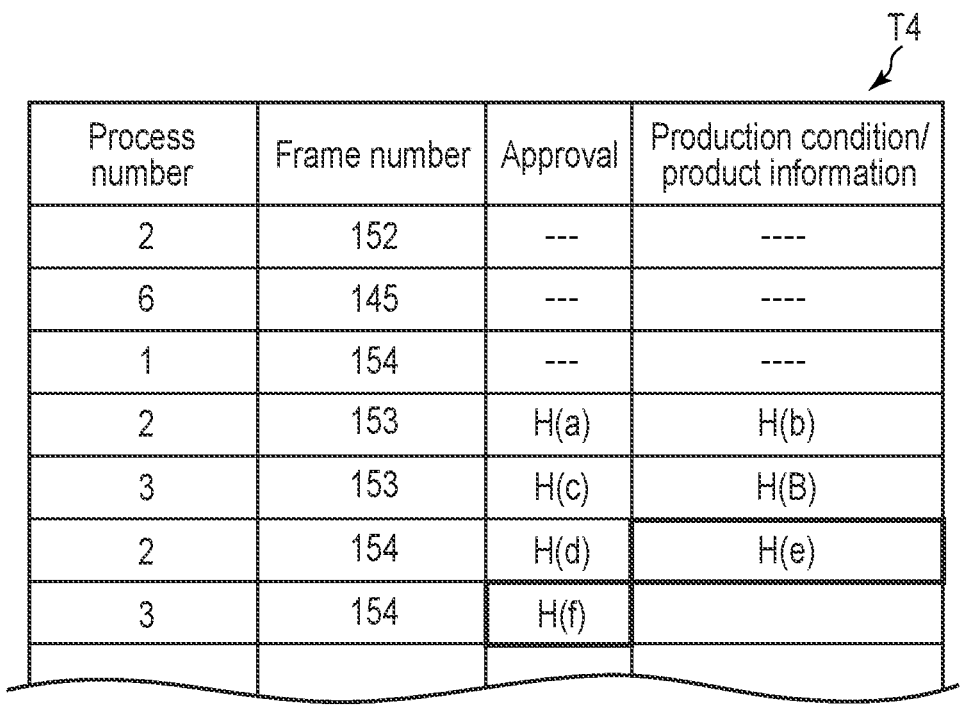
FIG. 12 shows an example of the management table according to the embodiment.

Upon receiving the production condition information e and the hash value H(f) from the upstream management device 102, the management device 103 of the third process calculates a hash value H(e) from the production condition information e. Then, the management device 103 subtracts the sum of the hash value H(e), hash value H(a) and hash value H(b) (second hash value) from the hash value H(f) (first hash value). Since the hash value H(f) corresponds to the sum of the hash values H(e), H(d), H(a) and H(b), the hash value H(d) is calculated by subtracting the hash value H(e) that is the calculated second hash value and the hash values H(a) and H(b) that are stored in the management table T. This hash value H(d) corresponds to the third hash value described above. The management device 103 compares the hash value H(d) as the calculated third hash value and the hash value H(d) stored in the management table T. If they coincide with each other, the product of frame number 154 is one produced under the correct production conditions in the second process. The management device 103 thus approves the hash values H(f) and H(e) and stores them in the management table T. Accordingly, the hash values H(f) and H(e) are stored in the management table T as shown in FIG. 12. The information is transmitted to the other management devices 101, 102 and 104 to 1040, and the hash values H(f) and H(e) are similarly stored in the management tables T of the management devices 101, 102 and 104 to 1040.

Then, the management device 103 calculates a hash value H(E) based on the production condition information E for producing a product. The hash values H(f) and H(e) are approved by the management device 103 and stored in the management table T managed in common to the management devices 101 to 1040. The management device 103 adds, to the hash value H(E), the hash values H(b) and H(c) stored in the management table T in the third process of the preceding frame number 153 in addition to the hash values H(e) and H(f) approved by the management device 101, thereby calculating a hash value H(F). This hash value H(F) corresponds to the first hash value described above. After that, the management device 103 transmits the production condition information E and the hash value H(F) to the downstream management device 104. Then, like the foregoing management device 103, the management device 104 repeats the process.

According to the production management system 1 configured as described above, products are managed on the basis of the management table T; thus, products having correct product information can easily be manage under correct production conditions. In addition, as product management, management of two types of production conditions and product information (measurement results) can be performed. In recent years, as described above, the number of items of production conditions and product information has increased and so has the data size, with the result that data held by the management device of each production process has increased. In addition, the number of electronic device components (DDS suspensions in the present embodiment) to be produced amounts to several million per day. It is thus complicated to manage all the data. However, the production management system 1 of the present embodiment makes it possible to easily manage whether a product within the specified value can be produced under the correct conditions during the manufacturing process, using the management table T including the hash values, and to reduce the amount of data to be managed via the network 50.

In the foregoing embodiment, the HDD suspensions have been described as an example of the electronic device components. The electronic device components are not limited to the HDD suspensions but can be applied to those to be produced through a plurality of production processes.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A production management system for electronic device components produced through a plurality of production processes, wherein:
   the production processes respectively include production devices each of which produces the electronic device components and management devices each of which manages the production device;
   the management devices store production condition information indicating conditions for producing the electronic device components in the production devices;
   the production management system includes a storage device which stores a hash value calculated from the production condition information as a management hash value for each of the production processes, when the electronic device components are produced in each of the production processes in accordance with the production condition information;
   the management devices includes a management device of a pre-process which adds a hash value of the production condition information received from a preceding process and a hash value calculated from the production condition information of the pre-process to calculate a first hash value and transmit the production condition information of the pre-process and the first hash value to a management device of a current process; and
   the management devices includes a management device of a current process which calculates a second hash value from production condition information received from the pre-process, calculates a third hash value obtained by subtracting the second hash value from the first hash value, compares the calculated third hash value and a management hash value of a process precedent to the pre-process, which is stored in the storage device, and stores the second hash value in the storage device when the third hash value coincides with the management hash value.

2. The production management system of claim 1, wherein:
   the electronic device components include a first electronic device component and a second electronic device component to be produced next to the first electronic device component;

upon calculating the first hash value for the second electronic device component, the management device of the pre-process adds a first hash value stored in the storage device for the first electronic device component to the first hash value to calculate a new first hash value; and the management device of the current process subtracts the second hash value and the first hash value for the first electronic device component stored in the storage device from the new first hash value, and compares the calculated third hash value with a management hash value of a process precedent to the pre-process stored in the storage device.

3. The production management system of claim 1, wherein:

the management devices each acquire product information indicating a result of measurement of electronic device components which have been completely produced;

the management device of the pre-process adds a hash value of the product information received from a preceding process and a hash value calculated from the product information of the pre-process to calculate a fourth hash value and transmit the product information of the pre-process and the fourth hash value to the management device of the current process; and the management device of the current process calculates a fifth hash value from the product information received from the pre-process, calculates a sixth hash value obtained by subtracting the fifth hash value from the fourth hash value, compares the calculated sixth hash value and a management hash value of a process precedent to the pre-process, which is stored in the storage device, and stores the fifth hash value in the storage device when the sixth hash value coincides with the management hash value.

4. The production management system of claim 1, wherein the management devices each store the second hash value in the storage device and then start to produce the electronic device components.

5. The production management system of claim 1, wherein the management devices stop production of the production devices managed by the management devices when the third hash value does not coincide with the management hash value.

6. A production management method of a production management system for electronic device components produced through a plurality of production processes, wherein:

the production processes respectively include production devices each of which produces the electronic device components and management devices each of which manages the production device;

the management devices store production condition information indicating conditions for producing the electronic device components in the production devices; and the production management system includes a storage device which stores a hash value calculated from the production condition information as a management hash value for each of the production processes, when the electronic device components are produced in each of the production processes in accordance with the production condition information, the production management method comprising:

causing a management device of a pre-process to add a hash value of the production condition information received from a preceding process and a hash value calculated from the production condition information of the pre-process to calculate a first hash value and transmit the production condition information of the pre-process and the first hash value to a management device of a current process; and causing a management device of a current process to calculate a second hash value from production condition information received from the pre-process, calculate a third hash value obtained by subtracting the second hash value from the first hash value, compare the calculated third hash value and a management hash value of a process precedent to the pre-process, which is stored in the storage device, and store the second hash value in the storage device when the third hash value coincides with the management hash value.

* * * * *